Aug. 5, 1958
J. A. COMPTON
2,845,871
MIXED FLOW BOOSTER PUMP
Filed May 20, 1955
3 Sheets-Sheet 1
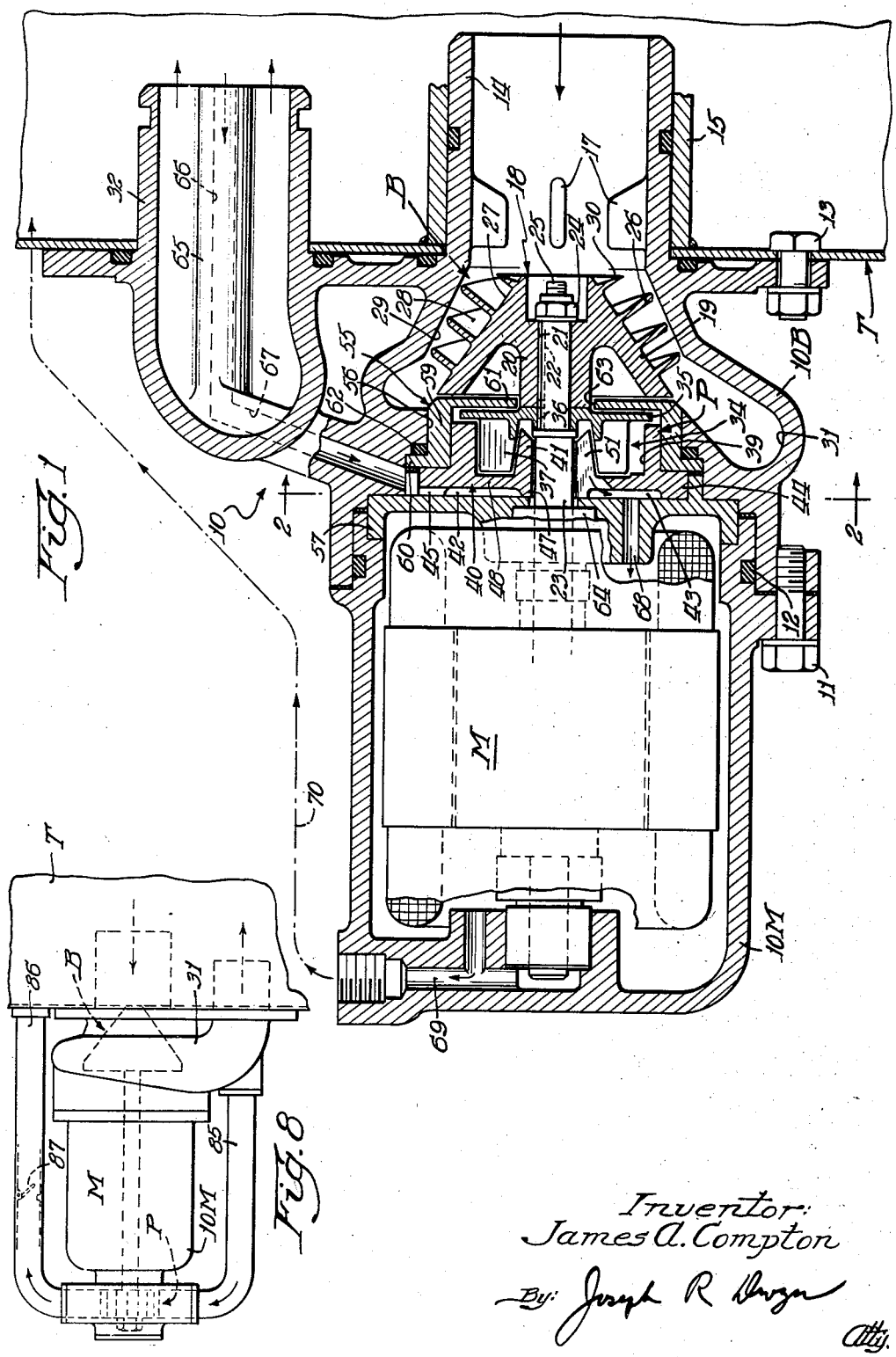
Inventor:
James A. Compton Aug. 5, 1958
J. A. COMPTON
2,845,871
MIXED FLOW BOOSTER PUMP
Filed May 20, 1955
3 Sheets-Sheet 2
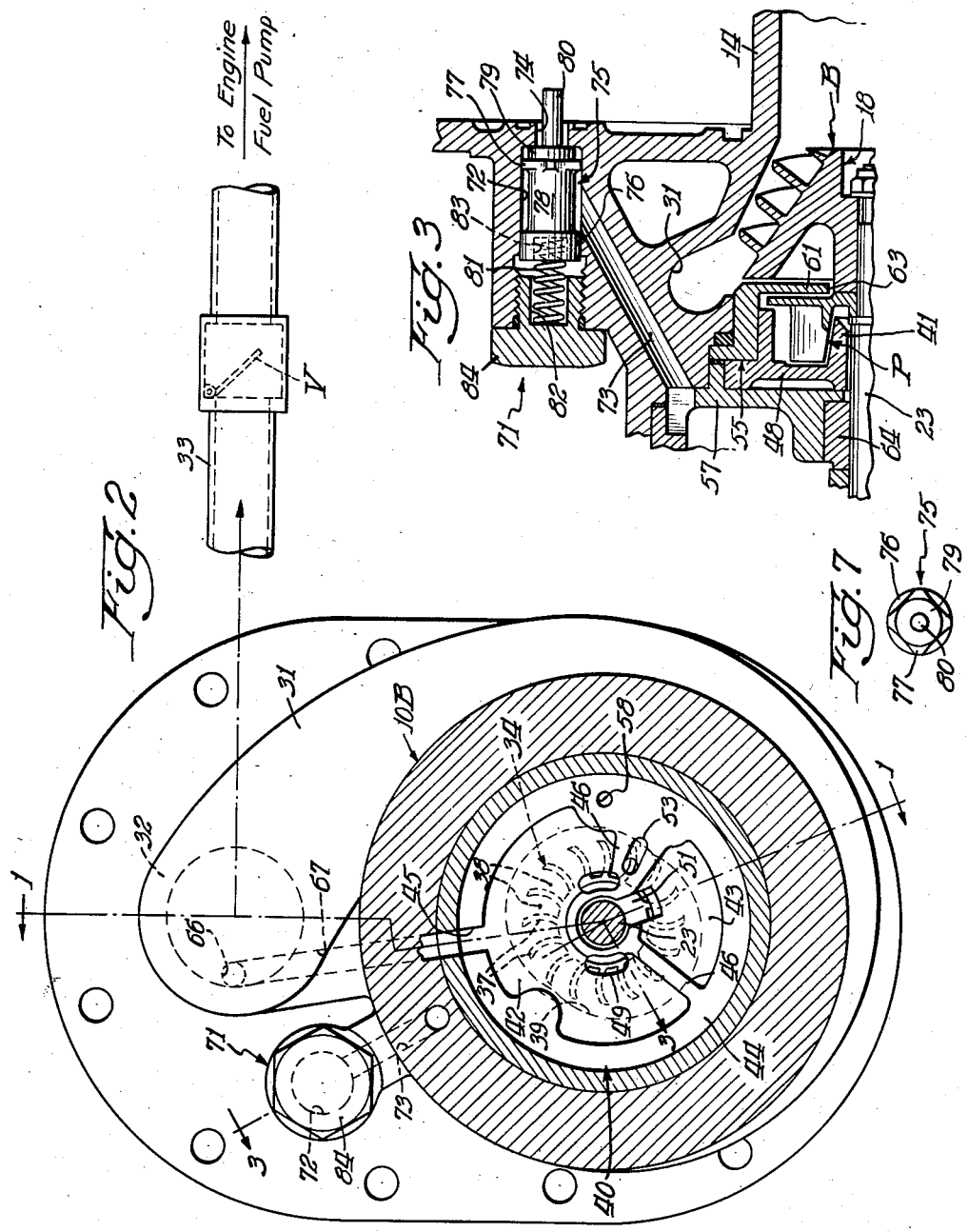
Inventor:
James A. Compton
By: Joseph R. Dwyer
Atty.

Aug. 5, 1958 J. A. COMPTON 2,845,871
MIXED FLOW BOOSTER PUMP
Filed May 20, 1955 3 Sheets-Sheet 3
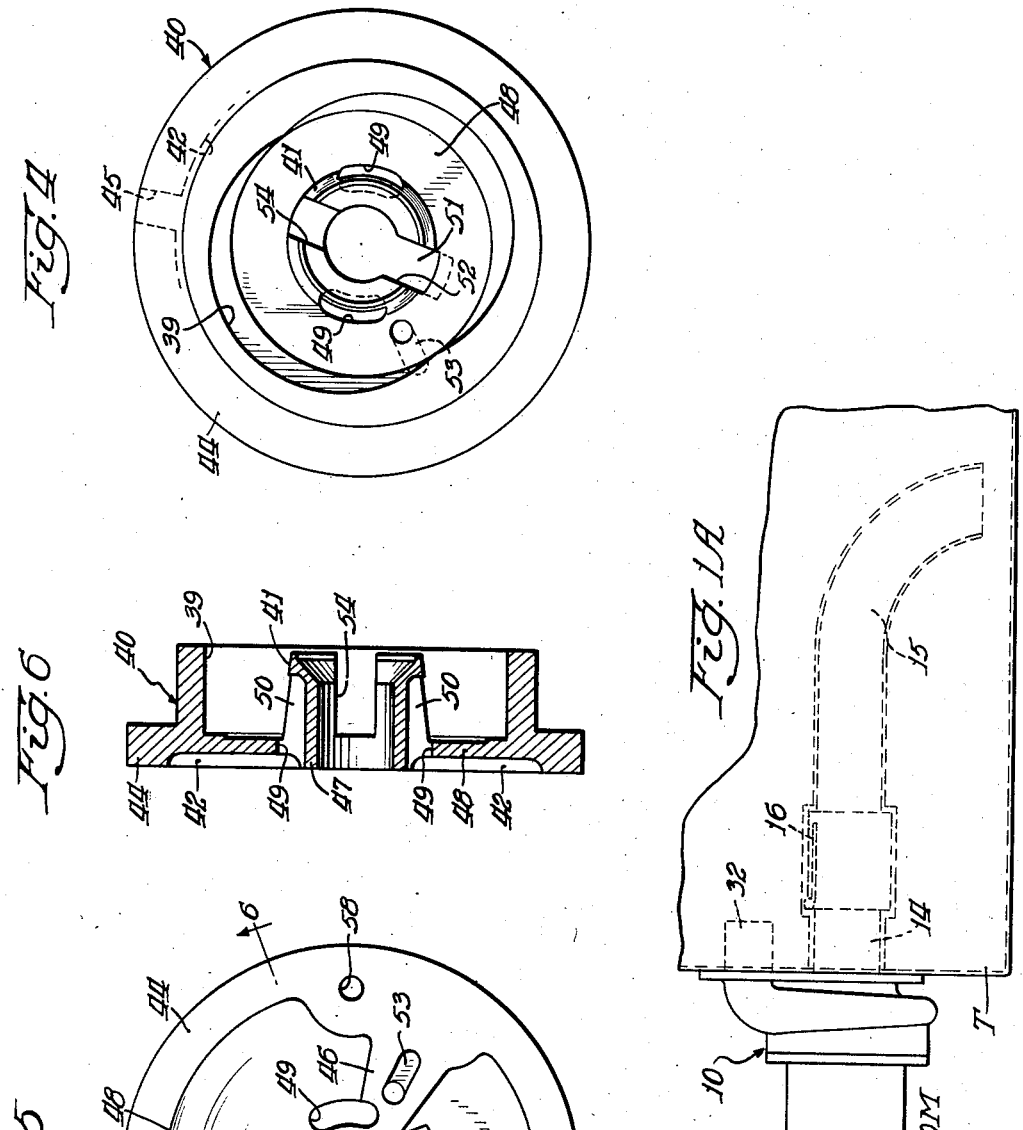
Inventor:
James A. Compton
By: Joseph R. Dwyer
Atty.

United States Patent Office 2,845,871
Patented Aug. 5, 1958

2,845,871

MIXED FLOW BOOSTER PUMP

James Albert Compton, South Euclid, Ohio, assignor to Borg-Warner Corporation, Chicago, Ill., a corporation of Illinois Application May 20, 1955, Serial No. 509,764

3 Claims. (Cl. 103—113)

This invention relates in general to the pumping of liquid, and is particularly concerned with an improvement in booster pumps for delivering highly volatile fuel from a source, such as an aircraft tank, to an engine fuel pump or to a point of consumption, such as the aircraft engine itself.

As is well known, the vapor pressure in high octane fuel used in aircraft is relatively high and is subject to boiling or vaporization as the aircraft rises from ground level to high altitudes where the pressure of the surrounding air is relatively low, possibly lower than the vapor pressure of the liquid fuel, and the vapor thus formed in the fuel tank renders it exceedingly difficult to deliver fuel from the tank, either in a liquid form or in the form of a liquid-vapor mixture having a lower vapor content. As aircraft becomes more developed, with higher and higher altitudes and faster aircraft accelerations being required, the problem of delivering fuel to the aircraft engine becomes still more difficult.

In connection with the further development of aircraft, where higher altitudes and faster aircraft accelerations are required, the modern design of thinner wings has rendered it difficult to mount a booster pump in the aircraft wing, since prior art booster pumps have required, for their proper operation, that they be mounted on a substantially vertical axis, either submerged within the wing tank itself or in the bottom thereof. Obviously, vertically mounting a booster pump assembly places serious limitations on the location of the fuel tank with respect to the aircraft wing and has rendered the development of thinner aircraft wings in which wing tanks could be mounted exceedingly difficult.

In view of the forgoing, it is apparent that it would be highly desirable to mount a booster pump assembly in a horizontal position because of the space limitations and the modern design of thinner aircraft wings. However, it has been found that a booster pump when so mounted lacks the ability to be self-priming and to re-prime during flight conditions.

This is so because the booster pump is unable to raise the fuel from the tank to its inlet and to pump with sufficient pressure to provide a flow of fuel to its discharge line and thereby to the fuel line.

Several reasons are present for this deficiency in a booster pump so mounted, one being at the start of the operation, after the pump is attached to an empty fuel tank, and the tank is filled with fuel, fuel rises and enters some parts of the pump. Any air in the pump will rise as the fuel enters the pump and will cause an air block of the pump discharge, so that the pump is unable to develop sufficient pressure to pump fuel, preventing the pump from being self-priming. Also, due to certain angles of aircraft operation, the fuel level in the tank drops below the level of the pump inlet, so that when normal flight is resumed, a horizontally mounted pump is not able to develop sufficient pressure to raise fuel into its inlet and to pump fuel to its discharge, so that the pump lacks the ability to re-prime. Accordingly, a primary object of my invention is the provision of a booster pump assembly, meeting the needs of the aircraft industry for a booster pump assembly which can be mounted to operate horizontally on the side of a wing tank and having the ability of being self-priming or able to re-prime.

In the preferred form of booster pump assembly in which my present invention may be applied, I will describe the same as applied in connection with the new and improved mixed flow booster pump described and claimed in the co-pending patent application of Thomas Lock, Serial No. 466,562, filed November 3, 1954, entitled "Mixed Flow Pump." It will be understood, however, that the description of my present invention as applied to the above-identified mixed flow booster pump is solely for the purpose of illustration, as my present invention may be adapted in any pump where the problem of self-priming or re-priming and/or horizontal mounting is involved.

In the aforementioned co-pending applicaton, there is described a fuel booster pump capable of pumping fuel, usually a mixture of liquid and vapor from any fuel container, more particularly, however, wing tanks of aircraft, to an external or an internal discharge line for ultimate use by aircraft engines. As further explained in that application, by providing in a fuel booster pump housing an improved impeller having a plurality of spiral vanes or blades so positioned and proportioned to effectively cooperate with the vapor-laden fuel and so positioned and proportioned to define therebetween passages of decreasing cross-sectional areas at increasing distances from the axis of rotation, the liquid-vapor mixture fuel, as it is drawn into and forced through the pumping chamber, is subjected to continually increasing pressure and continued condensation thereby reducing the vapor content of the liquid-vapor mixture.

To improve the booster pump assembly of the type described and to accomplish the primary object of my present invention, means are provided in the pump assembly for initially removing the air block in the discharge line of the booster pump, for initially providing suction in the discharge line to draw fuel into the booster pump inlet, and for continuously withdrawing a portion of the fuel in the booster pump discharge line thereby reducing the high pressure in the booster pump discharge line. The above accomplishment allows a booster pump to be mounted in a horizontal position, so that the pump will be capable of being self-priming and will have the ability of being re-priming. The removing of the air block, the providing of suction and the withdrawal of a portion of the fuel is accomplished, in the preferred embodiment of my invention, by connecting the inlet of a second pump, commonly driven on the driving shaft of the mixed flow impeller, with the mixed flow pump discharge line.

The fuel thus withdrawn can be returned to any source of low pressure and in the embodiments shown and later described is ultimately returned to the fuel tank. As an illustration of one type of second pump which can be employed to accomplish the desired function in the booster pump assembly constructed in accordance with the teachings of my present invention, reference is made to expired United States Patent No. 1,718,294, issued June 25, 1925, to I. C. Jennings, wherein there is shown and described a pump, commonly known in the industry as a liquid seal pump.

As a further refinement of my present invention the fuel withdrawn from the mixed flow booster pump discharge line by the second pump is discharged into the housing of an electric motor conjointly driving the impeller of the booster pump and the rotor of the second pump to provide a cooling fluid for the motor and to maintain the interworking parts of the motor continually submerged in fuel, thereby preventing the possibility of fire. The fuel in the motor housing serves to re-prime the liquid seal pump after those conditions of flight when the inlet of the booster pump is not submerged in fuel in the fuel tank. As a still further refinement of my invention, means are provided in the present invention for allowing quick disconnection of the booster pump assembly from the wing tank or container of fuel and this is accomplished by providing in the line communicating the fuel from the second pump discharge, whether discharged through the electric motor housing or directly to the fuel tank, a valve maintained opened by its association with the side of the fuel tank or container, and, which when removed from such association will close, preventing further flow of fuel from the line.

In general, therefore, my present invention has for its broad aspects an improved construction of a fuel booster pump assembly incorporating a means which will make the assembly self-priming or to allow it to re-prime under adverse operating conditions.

Still another object of my invention is the provision of an improved construction of a fuel booster pump assembly incorporating a means permitting the assembly to be mounted for horizontal operation.

Still another goal of my present invention is the provision of an improved construction of a fuel booster pump assembly incorporating a means providing greater cooling of the driving means.

Still another object of my invention is an improved construction of a fuel booster pump assembly incorporating means permitting ease of connection and disconnection of the assembly with a container of fuel or a fuel tank.

Still another goal of my present invention is the provision of a fuel booster pump assembly of the mixed flow type incorporating a second pump, so positioned to withdraw a portion of the fuel in the mixed flow pump discharge line to reduce the pressure in the discharge line preventing the mixed flow impeller from re-priming.

Still another important aspect of my invention is the provision of an improved construction of a fuel booster pump assembly of the mixed flow type incorporating a second pump to withdraw a portion of the fuel in the mixed flow pump discharge line and utilizing this withdrawn fuel to provide a cooling medium for the driving means.

Still another important object of my invention is the provision of an improved fuel booster pump assembly incorporating a mixed flow type impeller and a second pump to withdraw a portion of the discharge of the mixed flow pump and to pump this withdrawn fuel to a low pressure source, and to utilize the fuel in the source as a re-priming medium for the second pump, when necessary.

Still another object of my present invention is an improved construction of a fuel booster pump assembly of the mixed flow type which is self or re-priming and which can be readily connected to or disconnected from the side of an airplane wing tank or any container full of fuel.

Still another and important aspect of my invention is the provision of a new and improved construction of a fuel booster pump assembly incorporating a mixed flow type impeller and a liquid seal type rotor disposed in tandem and driven in unison on a common drive shaft by an electric motor and containing the refinement of being self-priming, providing coolant for the electric motor and readily adaptable for quick connection to or disconnection from a container full of fuel.

A still further object is to provide a new and improved pump especially adaptable for quick disconnection and connection to a fuel tank and ease of orientation of pump inlet with respect to the tank.

Other and more particular objects, advantages and uses of my invention will become more apparent from the reading of the following description taken in connection with the accompanying drawings which form a part hereof and wherein:

Figure 1 is a longitudinal sectional view of one embodiment of my inventon, taken on line 1—1 of Figure 2, looking in the direction of the arrows;

Figure 1A is an elevational view of the pump assembly of Figure 1 illustrating the inlet pipe of the tank to which the assembly is connected;

Figure 2 is a cross-sectional view taken on line 2—2 of Figure 1 and illustrating a second embodiment of my invention;

Figure 3 is a partial longitudinal sectional view taken on line 3—3 of Figure 2 and illustrating the valve means associated with the second embodiment of my invention allowing quick connection to or disconnection from the container of fuel;

Figure 4 is a front plan view of the liquid seal pump lobe cone;

Figure 5 is a rear plan view of the liquid seal pump lobe cone;

Figure 6 is a cross-sectional view of the liquid seal pump lobe cone taken on line 6—6 of Figure 5;

Figure 7 is an end view of the valve piston of Figure 3; and

Figure 8 is an elevational view, on a reduced scale, illustrating a third embodiment of my invention.

In the various views of the drawings, the same reference character is employed to refer to the same part.

Referring now to Figures 1 and 1A, there is illustrated a horizontally positioned housing, generally indicated at 10, comprising a motor housing 10M containing a remotely controlled electric motor M, a booster pump housing 10B containing a liquid seal pump P and a mixed flow booster pump B, the motor M and the pumps P and B being arranged in tandem. The housings 10M and 10B are connected by means, for example, bolts 11, and means, such as an O-ring seal 12, is provided between the housings to prevent the escape of fluid therebetween. The housing 10 is attached to the side of a fuel tank or container T by suitable means, such as bolts 13, for easy attachment and detachment, and is provided with an axially extending elongated inlet portion 14, communicating with the interior of a curved fuel inlet pipe 15 connected to the tank T and extending downwardly within the tank T to a position which may be approximately six inches below the inlet portion 14, for the passage of fuel or fuel-vapor mixture to the booster pump B, to be described. Insertion of the inlet portion 14 automatically opens a simple, one-way valve 16 disposed within the inlet pipe 15. The inlet portion 14 of the housing 10 is internally formed with a plurality of radially depending and spaced vanes 17 to direct the flow of fuel or fuel-vapor mixture to the booster pump B and to reduce the turbulence of the fuel or fuel-vapor mixture entering the booster pump.

The booster pump B is substantially the same as that described and claimed in the aforementioned co-pending Lock application and comprises an impeller indicated in its entirety as numeral 18 having a cone-shaped portion 19 and an axially extending, internally splined, cylindrical portion 20, the splines 21 of which cooperate with an externally splined portion 22 of the motor shaft 23, to provide a driving connection therebetween. The impeller 18 is retained in its proper operating position on the shaft 23 by means of a nut 24 received on a threaded portion 25 of the shaft.

The impeller 18 is provided with a plurality of spiral vanes 26, the number depending on the volume of fuel to be pumped, extending substantially perpendicular to the surface 27 of the cone-shaped portion 19, thereby defining substantially rectangular grooves or passages 28 between the vanes 26, the cross-section of which become increasingly smaller from inlet to discharge because of the difference in angular inclination of the inner housing wall 29 and the wall or surface 27 of the impeller body relative to the axis of rotation of the impeller. Fuel or fuel-vapor mixture entering the inlet 14 through the inlet pipe 15 is carried from the inlet edges 30 of the vanes 26 to discharge into a volute or scroll 31 having an axially extending discharge portion 32 into an internal or external fuel line 33, provided with a one-way valve V therein (see Figure 2) to prevent back pressure from entering the scroll 31, to a point of consumption, or to a fuel pump, or directly to the aircraft engine itself. The grooves or passages 28, presenting an increasingly smaller cross-section from inlet to discharge, an increasingly diminishing area is presented to the fuel or fuel-vapor mixture flow, so that pressure is imposed upon the fuel or fuel-vapor mixture in its spiral axial travel from the inlet of the booster pump until it is discharged into the scroll 31, with a resulting increase in pressure being imposed on the liquid-vapor fuel, so that not only is compression imparted thereto, but condensation of the vapors of the liquid-vapor mixture occurs.

The liquid seal pump P comprises a rotor, generally indicated at 34, having an annular plate-like portion 35, keyed at 36 or otherwise secured to the motor shaft 23, for conjoint rotation, and a plurality of axially extending curved vanes 37 (see Figure 2) defining chambers 38 therebetween. The rotor 34 is received in a generally elliptical or double lobe pumping chamber 39 in a radially and axially fixed, substantially cylindrical, lobe cone 40 (see Figures 4, 5 and 6) having an axially extending truncated cone-shaped portion 41 within the pumping chamber surrounding and spaced from the motor shaft 23 and about which the vanes 37 rotate.

The lobe cone 40, in addition to the pumping chamber, is provided with an inlet chamber 42 and a discharge chamber 43, the chambers 42 and 43 being defined by an annular wall 44, slotted at 45, for a purpose to be described, common separating web-like walls 46, 46 and a substantially circular wall 47 adjacent the motor shaft 23. The chambers 42 and 43 are separated from the pumping chamber 39 by means of a common wall 48. The wall 48 is provided with inlet passages 49, 49 intersecting grooves 50, 50 in the truncated cone-shaped portion 41 providing communication between the inlet chamber 42 and the pumping chamber 39, and is also provided with an outlet passage 51 intersecting a slot 52 in the truncated cone-shaped portion 41 providing a communication between the pumping chamber 39, the space around the motor shaft 23 and the discharge chamber 43. In addition to the passages thus described, one of the web-like walls 46 is provided with a passage 53 leading into the pumping chamber 39, the purpose of which will later become apparent, and, also, the truncated cone-shaped portion 41 is provided with a discharge slot 54 providing aditional communication between the pumping chamber 39 and the space around the motor shaft 23. Since the above-described pumping chamber actually defines two pumping chambers, the need for an outlet from each side is apparent and such outlets are provided in the form of the slots 52 and 54.

The lobe cone 40 is retained in position, on its right as viewed in the drawings, by means of a drum-like retainer 55 fitting into a complementary shaped opening 56 in the housing 10 and on its left by an annular retaining member 57, and, also by means of a locating pin or pins (not shown) received in openings 58 in the lobe cone. The retainer 55 has a cylindrical portion 59 surrounding the outer periphery of the lobe cone 36, an outwardly extending radial flange 60 and a radial annular plate-like portion or spacer 61. An O-ring seal 62 is provided between the flange 60 and the adjacent wall of the housing 10 to prevent the escape of fuel therebetween. The plate-like portion or spacer 61 is provided with a central aperture 63 of greater diameter than the motor shaft 23 through which the shaft 23 passes and is spaced from the rear of the mixed flow pump impeller 18 and from the annular portion 35 of the liquid seal pump rotor 34. Thus the spacer 61 acts to create a pressure drop between the pumping chambers of the pumps B and P, so that when there is fuel in the pump B, the pump P is constantly primed by fuel bleeding around the spacer 61. The retaining member 57 separates the pump P from the motor M and cooperates with the chamber defining walls 44, 46 and 47 to further define the chambers 42 and 43, and, also serves as a support for a bearing 64 for the motor shaft 23.

A pipe-like member 65 axially extends into the portion 32 of the booster pump discharge scroll 31 and is provided with a passage 66 comunicating at one end with the scroll discharge, adjacent the position of discharge into the fuel line 33, and at the other end with a passage 67 formed in the housing 10. The passage 67 communicates with the slot 45 and the inlet chamber 42 in the lobe cone 36 of the pump P. While the passage 66 has been illustrated as positioned to withdraw fuel from the discharge scroll at its juncture with the fuel line, it is to be expressly understood that this passage could be so positioned to withdraw fuel from any position along the length of the discharge scroll and the appended claims should be so interpreted. Thus, there is provided a means for withdrawing a portion of the fuel discharged from the pump B and directing this withdrawn portion to the inlet chamber 42 of pump P, and by means of the inlet passages 49 to the pumping chamber 39 of the pump P.

The fuel supplied to the pumping chamber 39 will travel around with the rotor and by centrifugal action will follow the outline of the pumping chamber 39. By such arrangement, the fuel will be forced into and out of the chambers 38, defined by the vanes 37, through the slots 52 and 54 in the truncated cone-shaped portion 41 and around the motor shaft 23 to the outlet 51 and into the discharge chamber 43. The retaining member 57 is provided with a plurality of openings or passages 68 (only one of which is shown) providing a communication between the discharge chamber 43 and the interior of the motor housing 10M, so that fuel discharged by the pump P is discharged into the motor housing 10M, wherein it functions to cool the interworking parts of the motor. In the first embodiment of my invention, as illustrated in Figure 1, the fuel from the motor housing 10M is discharged through a passage 69, in the housing 10M, into a conduit or line, indicated at 70, to a low pressure source, or as illustrated, to the tank T. In addition to the passages 68, the retainer member 57 is provided with an opening (not shown) in alignment with the passage 53 in the lobe cone 40, previously described.

When the booster pump assembly is connected to the tank T, as previously described, fuel will flow into the pump housing and a portion of the fuel will pass around the spacer 61 and into the liquid seal pump pumping chamber 39. When the motor is energized, the booster pump impeller 18 and the liquid seal pump rotor 34 will be conjointly rotated. Because of the air block in the booster pump discharge line, and because it is necessary to lift fuel to the booster pump impeller 18, the impeller 18 is unable to develop sufficient pressure to raise fuel into the discharge line to actuate the valve V and supply fuel to the fuel line 33. The fuel entering the pump P allows it to be self-priming and because of communication existing between the discharge of the pump B and the inlet of the pump P, the air block will be removed from the discharge line of the pump B, and the pressure in the discharge line will be reduced, thereby allowing the pump B to be self-priming and to develop sufficient pressure to supply fuel to the discharge line, to operate the valve V and to pump fuel to the fuel line 33.

As the operation of the pump continues, a portion of the discharge developed by the booster pump B is continuously withdrawn and communicated to the liquid seal pump. This discharge is normally under a greater pressure than that developed by the pump P, so that the pump P runs as a motor, discharging fuel into the motor housing 10M. Under adverse conditions of flight, as when the fuel in the tank T drops from the level of the inlet pipe 15, any fuel in the motor housing 10M bleeds back into the pumping chamber 39 of the pump P through the opening in the motor housing 10M in alignment with the passage 53 in the lobe cone 40, so as to continuously prime the pump P. Under this latter condition, when normal flight is again resumed, the pump P will be effective to again lower the pressure in the discharge line of the pump B allowing the pump B to re-prime and again develop sufficient pressure to pump fuel to the fuel line 33.

The second embodiment, illustrated in Figures 2, 3 and 7 differs from the first embodiment, above described, in the manner in which the fuel discharged by the liquid seal pump P to the interior of the motor housing 10M is discharged from the motor housing 10M to a low pressure source, such as the fuel tank T.

Thus, there is illustrated in Figures 2, 3 and 7, a valve means, indicated in its entirety at 71, having a valve chamber 72 communicating by means of a passage 73 with the interior of the motor housing 10M, the passage 73 being radially offset from the scroll 31 (see Figure 2), and by means of a pasasge 74 with the interior of the fuel tank T. This arrangement is employed in lieu of the passage 69 and the conduit or line 70 of the first embodiment; otherwise the structure and operation of the fuel and second embodiments is identical.

A piston 75 is slidably disposed in the valve chamber 72 and is provided with spaced lands 76 and 77, grooves 78 and 79 and a pin portion 80 extending through the passage 74. One end of a coil spring 81 is received in a cavity 83 in the piston 75 and the other end of the spring is received in a cavity 82 in a bolt member 84 threadably received in the chamber 72, so as to resiliently urge the piston to the right, as shown in Figure 3.

An opening (not shown) is provided in the tank T offset from the pin portion 80, so that when the pump assembly is connected to the tank T, the pin portion will engage a portion of the tank wall and the piston 75 will be moved to the left against the action of the coil spring 81. Because of the outline of the land 77 (see Figure 7), when the groove portion 79 is out of contact with the front wall of the valve chamber 72, a communication is established between the interiors of the motor housing 10M and the tank T to allow discharge of fuel from the interior of the motor housing 10M to the tank T.

The valve 71 allows quick detachment of the pump assembly from the tank T, since when disconnected, the valve will move to the position shown in Figure 3 closing off the above described communication, and fuel in the motor housing 10M, at the time of detachment, will remain in the housing 10M and will not spill or leak out.

Reference is now made to the third embodiment of my invention, as illustrated in Figure 8. The major difference between this embodiment and the other previously described embodiments is the particular placement of the pumps B and P relative to the motor M, and also, that no fuel is pumped through the motor housing 10M. The structure of the pumps is substantially the same as that shown and described with reference to Figures 1 to 3.

Here, the booster pump B is disposed at one end of the motor M adjacent the tank T, and the liquid seal pump P is disposed at the opposite end of the motor M. A conduit or line 85 extends into the booster pump discharge scroll 31 in the same manner as described with reference to Figure 1, and a portion of the fuel in that discharge is continuously withdrawn by the pump P. The pump P discharges into a conduit or line 86 suitably connected for easy detachment with the tank T, and fuel from the pump P is thereby returned to the tank T. A one-way valve 87 is disposed in the conduit or line 86 to prevent back pressure from entering pump P. The operation of the assembly is substantially like that of the first and second embodiments.

Thus, there has been described a booster pump assembly comprising a booster pump and a liquid seal pump, mounted in tandem and so arranged to allow the assembly to be mounted in a horizontal position, with the booster pump having the ability to be self-priming and to re-prime under all operating conditions, this being accomplished by reducing the pressure in the booster pump discharge line, so that fuel is drawn into the booster pump allowing the booster pump to develop sufficient pressure to pump fuel to a fuel line.

The previously description has referred to the pump assembly as being mounted in a horizontal plane and being attached externally to the fuel tank. It is to be understood that the pump assembly may equally be mounted in a vertical plane or any desirable angle and may be internally mounted in the fuel tank.

It is to be expressly understood that this invention, in its broadest interpretation consists of an arrangement of two pumps commonly driven in tandem, and having the ability to be self-priming and to re-prime while mounted in a horizontal position. It is not to be limited to the specific types of pumps above described, these types being employed to facilitate description only. In this connection, a centrifugal booster pump may be employed in lieu of the specific mixed flow booster pump and any other suitable pump, capable of performing the function, may be employed in lieu of the specific liquid seal pump.

Where herein the various parts of this invention have been referred to as located in a right or left position, it will be understood that this is done solely for the purpose of facilitating description and that such references relate only to the relative positions of the parts as shown in the accompanying drawings.

Also, it will be understood that many changes and modifications may be made without departing from the spirit and scope of the invention and that the invention is designed and comprehended within the scope of the appended claims which should be given a scope consistent with the prior art.

I claim:

1. A pump assembly comprising, a pump including a conically-shaped pumping chamber, provided with an inlet thereto and a scroll-shaped discharge therefrom, a complementary shaped impeller means provided with a plurality of spirally arranged vanes thereon, received in said chamber for pumping fluid from said inlet through said chamber to said discharge, means reducing pressure in said discharge to allow a flow of fluid from a source into said inlet, said last-named means comprising a second pump including a double lobe pumping chamber provided with an inlet thereto and an outlet therefrom, a rotor means provided with a plurality of axially extending circularly arranged curved vanes thereon, received in said second-named pumping chamber for pumping fluid from said second-named inlet through said second-named chamber to said outlet, means providing communication between said discharge and said second-named inlet and means for conjointly rotating said impeller means and said rotor means.

2. In a pump assembly adapted to be connected to and disconnected from a low pressure source of fluid; a housing provided with a first and a second pumping chamber each having an inlet thereto and an outlet therefrom, and a substantially closed third chamber; an impeller means received in said first pumping chamber for pumping fluid from its inlet to its outlet; means to reduce pressure in said outlet of said first pumping chamber to allow a flow of fluid from said source to the inlet of said first pumping chamber comprising, a rotor means received in said second pumping chamber for pumping fluid from its inlet to its outlet; and means providing communication between the outlet of said first pumping chamber and the inlet of said second pumping chamber; means for conjointly rotating said impeller means and said rotor means comprising a remotely controlled electric motor provided with a shaft upon which said impeller means and said rotor means are mounted received in said third chamber; means for providing communication between said third chamber and the outlet of said second pumping chamber to provide a pumping flow of fluid to said third chamber to cool said electric motor; and means providing a communication between said third chamber and said source of low pressure to allow discharge of said fluid from said third chamber; said last-named means including a slidable valve means adapted to be opened when said pump assembly is connected to said source of fluid and to be closed when said pump assembly is disconnected from said source of fluid so that any fluid in said third chamber will remain therein when said assembly is disconnected.

3. In a pump assembly adapted to be connected to and disconnected from a low pressure source of fluid; a housing providing a conically-shaped pumping chamber and a cylindrically shaped pumping chamber each having an inlet thereto and an outlet therefrom, and a third chamber; a conically-shaped impeller means provided with a plurality of spirally arranged vanes thereon; received in said conically-shaped pumping chamber for pumping fluid from inlet to outlet of said conically-shaped chamber; means to reduce pressure in said outlet of said conically-shaped pumping chamber to allow a flow of fluid from said source to the inlet of said conically-shaped pumping chamber comprising a circular rotor means provided with a plurality of axially extending circularly arranged curved vanes thereon received in said cylindrical pumping chamber for pumping fluid from inlet to outlet of said cylindrically shaped chamber and means for providing communication between the outlet of said conically-shaped pumping chamber; means for conjointly rotating said impeller means and said rotor means comprising a remotely controlled electric motor provided with a shaft upon which said impeller means and said rotor means are mounted received in said third chamber; means providing communication between said third chamber and the outlet of said cylindrical pumping chamber to provide a flow of pumping medium to said third chamber to cool said electric motor; and means providing communication between said third chamber and said source of low pressure allowing a discharge of said fluid from said third chamber, said last-named means including a slidable valve member adapted to be opened when said pump assembly is connected to said source of fluid and closed when said pump assembly is disconnected from said source of fluid.

References Cited in the file of this patent

UNITED STATES PATENTS

| Number | Name | Date |
|---|---|---|
| 605,888 | Maginot | June 21, 1898 |
| 718,557 | Wenzel | Jan. 13, 1903 |
| 2,134,686 | De Lancey | Nov. 1, 1938 |
| 2,153,360 | Auger et al. | Apr. 4, 1939 |
| 2,368,529 | Edwards | Jan. 30, 1945 |
| 2,470,319 | Norris | May 17, 1949 |
| 2,500,228 | Adams | Mar. 14, 1950 |
| 2,524,269 | Patterson | Oct. 3, 1950 |
| 2,581,828 | Adams | Jan. 8, 1952 |
| 2,660,120 | Edwards | Nov. 24, 1953 |
| 2,704,516 | Mock et al. | Mar. 22, 1955 |